(12) United States Patent
Mandokoro

(10) Patent No.: US 10,948,384 B2
(45) Date of Patent: Mar. 16, 2021

(54) POSITION DETECTION SWITCH AND METHOD FOR MANUFACTURING SAME

(71) Applicant: SMC CORPORATION, Chiyoda-ku (JP)

(72) Inventor: Jiro Mandokoro, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 72 days.

(21) Appl. No.: 16/337,063

(22) PCT Filed: Sep. 5, 2017

(86) PCT No.: PCT/JP2017/031887
§ 371 (c)(1),
(2) Date: Mar. 27, 2019

(87) PCT Pub. No.: WO2018/061647
PCT Pub. Date: Apr. 5, 2018

(65) Prior Publication Data
US 2020/0033230 A1 Jan. 30, 2020

(30) Foreign Application Priority Data

Sep. 28, 2016 (JP) .............................. JP2016-189950

(51) Int. Cl.
*G01M 15/06* (2006.01)
*B29C 45/14* (2006.01)
(Continued)

(52) U.S. Cl.
CPC ....... *G01M 15/06* (2013.01); *B29C 45/14491* (2013.01); *G01B 7/003* (2013.01); *B29L 2031/3443* (2013.01)

(58) Field of Classification Search
CPC .. G01M 15/06; B29C 45/14491; G01B 7/003; B29L 2031/344; H01H 9/02; H01H 11/00; H01H 36/00
(Continued)

(56) References Cited

U.S. PATENT DOCUMENTS 6,873,173 B2 * 3/2005 Kollmer ............... G01R 31/275
324/750.16
6,937,047 B2 * 8/2005 Tran ................... G01R 31/2884
324/750.3
(Continued)

FOREIGN PATENT DOCUMENTS

JP 3-79143 U 8/1991
JP 6-60763 A 3/1994
(Continued)

OTHER PUBLICATIONS

International Search Report dated Nov. 28, 2017, in PCT/JP2017/031887 filed on Sep. 5, 2017.

*Primary Examiner* — Giovani Astacio-Oquendo
(74) *Attorney, Agent, or Firm* — Oblon, McClelland, Maier & Neustadt, L.L.P.

(57) ABSTRACT

A position detection switch is provided with a case having a cylindrical part that has a plurality of ribs on an inner circumferential wall thereof along the axial direction thereof. Accordingly, the strength of the case is increased and running of a molten resin for fixing a substrate disposed on the inside are improved when the molten resin is injected from a long groove of the case. The contact surface area between the ribs and a sheath is increased whereby durability against an external force and temperature variation is increased.

9 Claims, 11 Drawing Sheets

(51) Int. Cl.
*G01B 7/00* (2006.01)
*B29L 31/34* (2006.01)

(58) Field of Classification Search
USPC .............. 324/762.02, 762.01, 537, 500
See application file for complete search history.

(56) References Cited

U.S. PATENT DOCUMENTS

| | | | |
|---|---|---|---|
| 7,492,180 B2 * | 2/2009 | Forstner | G01S 7/032 324/750.3 |
| 2010/0015438 A1 * | 1/2010 | Williams | C30B 25/02 428/332 |
| 2011/0176563 A1 * | 7/2011 | Friel | C30B 25/02 372/3 |
| 2015/0299894 A1 * | 10/2015 | Markham | B82Y 10/00 250/458.1 |

FOREIGN PATENT DOCUMENTS

| | | |
|---|---|---|
| JP | 10-249883 A | 9/1998 |
| JP | 2001-297671 A | 10/2001 |

* cited by examiner

POSITION DETECTION SWITCH AND METHOD FOR MANUFACTURING SAME

TECHNICAL FIELD

The present invention relates to position detection switches and a method for manufacturing the same, and more specifically, relates to position detection switches for detecting positions of pistons reciprocating in actuators, for example, cylinders in a non-contact manner and methods for manufacturing the same.

BACKGROUND ART

In air cylinders and hydraulic cylinders, position detection switches have been widely used to detect positions of pistons reciprocating inside cylinder bores in a non-contact manner. For example, Japanese Laid-Open Patent Publication No. 2001-297671 proposes a position detection switch with a structure including a sensor case, a cord bush disposed at the rear end of the sensor case, and a cord connected to a sensor element and extended to the outside of the sensor case. According to the invention disclosed in Japanese Laid-Open Patent Publication No. 2001-297671, the cord would not be bent inside the sensor case even when the cord is bent at the cord bush, and thus no gaps are created between the cord and filler inside the sensor case, resulting in higher safety against water. Japanese Laid-Open Patent Publication No. 10-249883 proposes a structure formed by filling resin into a sensor case while the sensor case is fitted in shaping dies simultaneously with shaping of resin of a grommet part at a lead wire wire outlet.

SUMMARY OF INVENTION

In the structures of the sensor switches disclosed in Japanese Laid-Open Patent Publication Nos. 2001-297671 and 10-249883, a substrate, on which a sensor body, an LED, and the like are mounted, is disposed inside the thin-walled sensor case composed of resin, and a cable is connected to the substrate. The cable is partially located inside the sensor case, and the remaining portion of the cable guided outside the sensor case is connected to a power source, a CPU electrically processing a signal indicating the detected position of a piston, and the like. In this case, the cable includes a lead wire for feeding the power and the signal and a sheath covering the lead wire. The sheath is cut at an end part inside the sensor case and extends from the end part toward the substrate. The lead wire is electrically connected to the substrate after an insulating film is partially removed from the lead wire.

In such a sensor switch structure, as illustrated in FIG. 11, when molten resin B is filled into a sensor case A from an open end part to secure a substrate and the like inside the sensor case during manufacturing of the sensor switch, a lead wire C and a sheath D are often displaced significantly from the axis center of the sensor case A by the pressure of the resin and brought into contact with the inner wall of the sensor case A. In a case where the sheath D is brought into contact with the inner wall of the sensor case A, the resin B does not sufficiently spread to the contact portion inside the small sensor case A. More specifically, the resin for sealing the substrate cannot enter the gap between the sensor case A and sheath D. As a result, for example, in a case where the thin-walled sensor case A expands and contracts due to applied external forces and changes in ambient temperature when the sensor case is secured to a cylinder using a screw and the like or in a case where a cable is pulled from the outside, the sensor case A and the sheath D may be separated from each other at the contact portion, or the sheath D itself may be broken. Furthermore, fine particles or moisture may enter the interior of the sensor case A through the portion at which the sheath D is separate from the sensor case A or the broken portion and may cause electrical defects in circuits and electrical components provided for the substrate.

The present invention is produced to solve the aforementioned problems, and an object of the present invention is to increase protection against dust and moisture. Furthermore, another object of the present invention is to provide a position detection switch with increased durability against a pull at the cable, twisting force occurring when the sensor switch is screwed to be secured, and the like, the durability resulting from the joint surface between the inner wall of the sensor case and the sheath increased to obtain sufficient joining force, and with high stiffness due to the less breakable joint surface between the sheath and the inner wall of the sensor switch even when the sensor case expands or contracts due to changes in ambient temperature, and a method for manufacturing the same.

To achieve the above-described objects, the present invention includes a sensor case, a substrate disposed inside the sensor case and on which an electronic component is mounted, and a cable including a lead wire electrically connected to the substrate, wherein the lead wire is enclosed with a sheath, the sensor case includes a plurality of ribs separate from each other at a predetermined interval on an inner wall of the sensor case and extending in an axial direction of the sensor case, and the ribs separate the sheath from the inner wall of the sensor case to leave gaps between the sensor case and the sheath during injection of a molten resin into the sensor case.

According to the structure, the ribs hold the sheath to separate the sheath from the inner wall of the sensor case when the molten resin is injected into the interior of the sensor case. This creates the gaps between the sheath and the inner wall of the sensor case, and thus even the molten resin injected at a considerably high pressure can effectively fill the gaps between the sheath and the inner wall of the sensor case without the sheath coming into direct contact with the inner wall of the sensor case. As a result, the sensor case, the sheath, and the resin are joined together with sufficient contact areas after the curing of the resin.

In this case, the ribs preferably extend from positions away from a point corresponding to a molten resin injection port located at a first end part of the sensor case toward a second end part.

According to the structure, the ribs do not exist at positions corresponding to the molten resin injection port of the sensor case. Thus, the molten resin is injected along the inner wall adjacent to the first end part of the sensor case, and then flows toward the second end part of the sensor case. This further improves the fillability of the resin.

Moreover, in the present invention, end portions of the ribs located adjacent to the molten resin injection port in the axial direction of the sensor case are preferably cut out. According to the structure, the molten resin is injected from the molten resin injection port orthogonally to the axis of the sensor case. This further improves the fillability during injection of the molten resin.

A cross-sectional shape of the ribs orthogonal to the sensor case may be trapezoidal, arch-shaped, or quadrangular.

Moreover, in the present invention, the sensor case and the ribs are preferably integrally molded using a material of an identical property. According to the structure, the ribs can be integrally molded with the sensor case, so that thus formed ribs also increases the strength of the sensor case.

Moreover, in the present invention, it is preferable that the ribs extend discontinuously in the axial direction of the sensor case. According to the structure, the molten resin flows through the points where the ribs are discontinuous in the injection of the molten resin. This further improves the fillability of the molten resin.

Moreover, in the present invention, it is preferable that a support portion be disposed on the inner wall to hold the substrate and that end portions of the ribs be separate from the support portion. According to the structure, the molten resin flows through the points where the ribs are discontinuous in the injection of the molten resin. This further improves the fillability of the molten resin.

Moreover, in the present invention, the end portions of the ribs are preferably cut out to be tapered. According to the structure, the molten resin is injected from the molten resin injection port orthogonally to the axis of the sensor case at the first end part of the sensor case. This further improves the fillability during injection of the molten resin.

Moreover, in the present invention, a plurality of the lead wires are preferably electrically connected to surfaces on either side of the substrate. According to the structure, for example, in a case where electric circuits are printed on both sides of the substrate, the molten resin fills on both sides of the substrate in a balanced manner.

Furthermore, a method for manufacturing a position detection switch according to the present invention, the position detection switch including a sensor case, a substrate disposed inside the sensor case and on which an electronic component is mounted, and a cable including a lead wire electrically connected to the substrate, comprises the steps of forming a plurality of ribs separate from each other at a predetermined interval on an inner wall of the sensor case and extending in an axial direction simultaneously with shaping of the sensor case during forming of the sensor case, then inserting the cable connected to the substrate into the interior of the sensor case, and injecting a molten resin from a first end part of the sensor case and curing the molten resin while the ribs formed on the sensor case keep a sheath constituting the cable separate from the inner wall of the sensor case.

As described above, the ribs integrated with the inner wall of the sensor case separate the sheath from the inner wall of the sensor case such that the sheath floats above the sensor case, allowing the molten resin to effectively fill the gaps between the inner wall of the sensor case and the sheath. This causes the sensor case, the sheath, and the resin to be firmly joined together, resulting in an increase in the joint strength between the sensor case, the sheath, and the resin and in the durability against external forces, changes in temperature, and the like.

According to the present invention, the sensor case and the sheath firmly joined together via the resin provide excellent protection against dust and moisture. Moreover, the sheath does not separate from the sensor case even when the cable is pulled outward, and effects such as having sufficient durability against twisting force during securing of the position detection switch to an actuator or changes in temperature are obtained.

DESCRIPTION OF EMBODIMENTS

Figure 1:
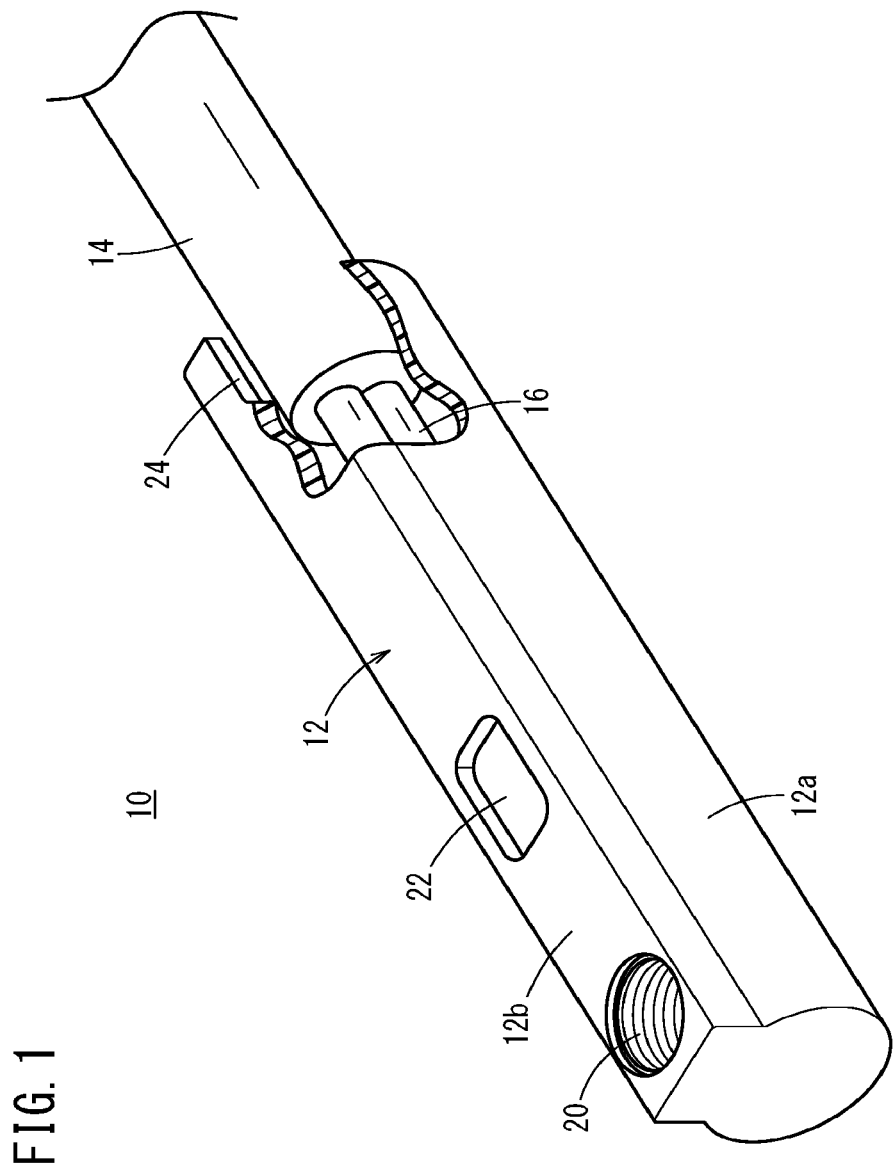
FIG. 1 is a partially cut-off perspective view illustrating a state where a substrate connected to a cable is accommodated inside a sensor case in a position detection switch according to the present invention.
Figure 2:
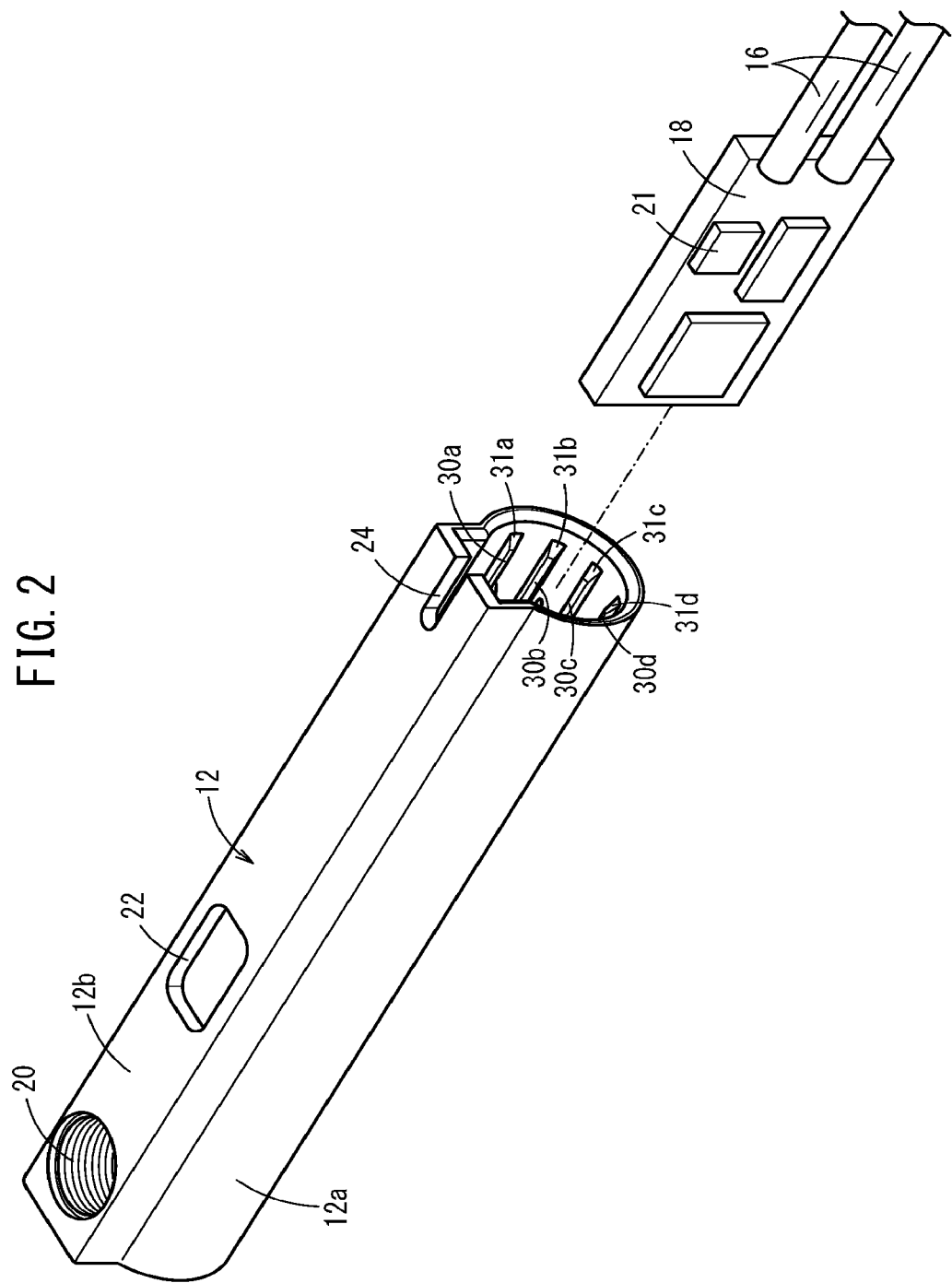
FIG. 2 is a perspective view illustrating a state before the substrate is inserted into the sensor case in the position detection switch illustrated in FIG. 1.
Figure 3:
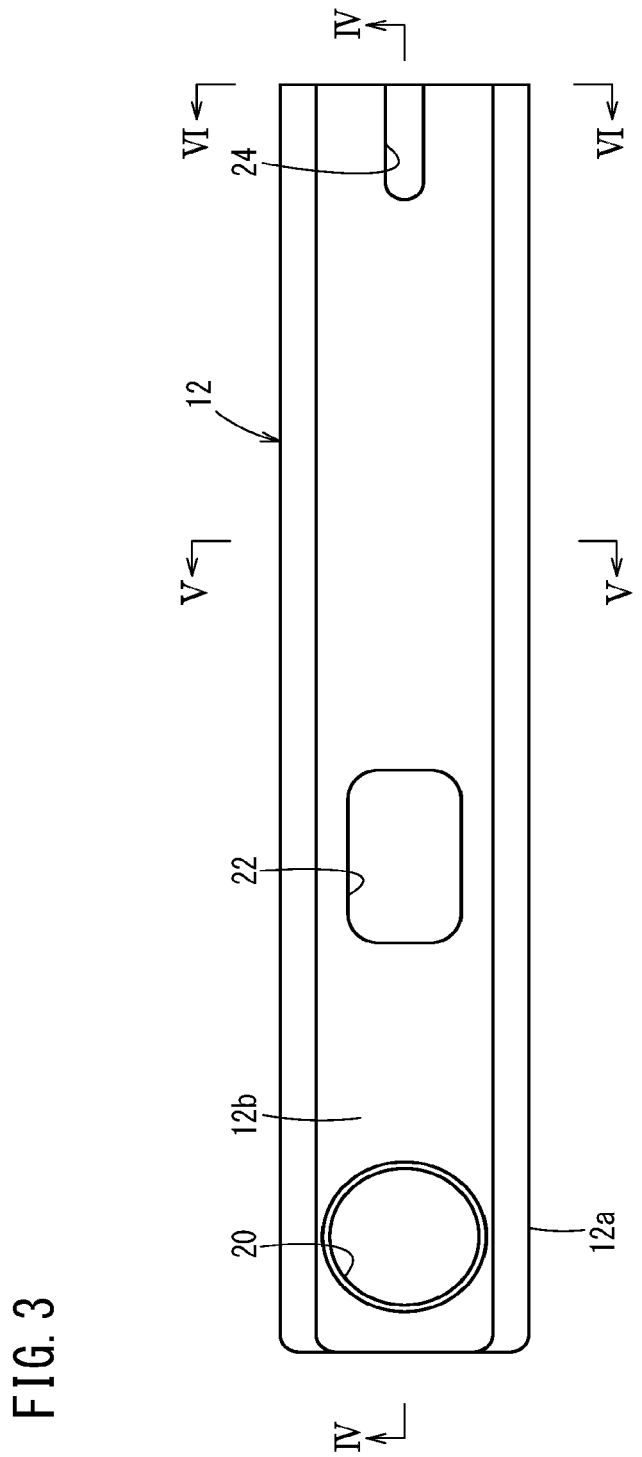
FIG. 3 is a plan view of the sensor case.

Next, an embodiment of a position detection switch according to the present invention will be described in detail below. In this embodiment, FIG. 1 is a partially cut-out perspective view illustrating a state where a substrate connected to a cable is accommodated inside a sensor case in the position detection switch, FIG. 2 is a perspective view illustrating a state before the substrate is inserted into the sensor case in the position detection switch, and FIG. 3 is a plan view of the position detection switch. In this embodiment, a position detection switch 10 basically includes a sensor case (hereinafter referred to as "case") 12, a plurality of lead wires 16 constituting a cable 14, and a substrate 18 electrically connected to ends of the lead wires 16 with a light-emitting diode (LED) 21 (described later) and other electronic components mounted to be stored inside the case 12.

The case 12 includes a cylindrical portion 12a and a rectangular parallelepiped portion 12b. The portions constitute an integrally molded component partially communicating with each other in the axial direction and are composed of resin such as PBT, PA, ABS, PPS, and PC. As is clear from FIG. 1, openings of the cylindrical portion 12a and the rectangular parallelepiped portion 12b are closed at a first end part (on the left in FIG. 1) of the case 12, and openings at a second end part (on the right in FIG. 1) are open (see FIG. 2) until the position detection switch is completed. A screw hole 20 passing from the rectangular parallelepiped portion 12b to the cylindrical portion 12a to receive a fastening screw is formed in the first end part of the case 12, and a partition 19 (see FIG. 4) separate the interior of the case 12 from the screw hole 20. A rectangular window 22, allowing the LED 21 lit on the substrate 18 secured inside the case 12 to be visually checked from the outside, is formed in the rectangular parallelepiped portion 12b at a position away from the screw hole 20 toward the second end part. The window 22 is sealed with a transparent resin material.

A long groove (molten resin injection port) 24 for filling the interior of the case 12 with a molten resin is formed in the second end part of the rectangular parallelepiped portion 12*b* constituting the case 12. Support portions 26*a* and 26*b* for holding the substrate 18 electrically connected to the ends of the lead wires 16 protrude inward inside the rectangular parallelepiped portion 12*b* adjacent to the first end part. More specifically, the support portions 26*a* and 26*b* are disposed adjacent to the first end part of the rectangular parallelepiped portion 12*b* and extend toward the partition 19. The LED 21 on the substrate 18 is set to face the window 22 sealed with transparent resin when the substrate 18 at the end of the cable 14 is fitted in the vicinity of the end of the case 12.

In this embodiment, a plurality of ribs 30*a* to 30*f* radially protrude from the inner wall of the cylindrical portion 12*a*. In this case, end portions 31*a* to 31*f* of the ribs 30*a* to 30*f*, respectively, adjacent to the second end part of the cylindrical portion 12*a* are cut out to be tapered such that a molten resin are injected from the long groove 24 orthogonally to the axis of the case 12. More specifically, the ribs 30*a* to 30*f* rise from positions slightly away from the end of the cylindrical portion 12*a* toward the first end part through the end portions 31*a* to 31*f*, respectively, cut out to be tapered. The ribs 30*a* to 30*f* slightly cut out adjacent to the second end part of the cylindrical portion 12*a* and protruding inward to the axis center of the case 12 then extend to the first end part of the cylindrical portion 12*a* along the longitudinal direction of the cylindrical portion 12*a*. The ribs 30*a* to 30*f* are preferably integrally molded with the case 12 during the production process. Thus, the case 12 and the ribs 30*a* to 30*f* are composed of a material of an identical property. Thus formed ribs 30*a* to 30*f* also increase the strength of the case 12.

Figure 4:
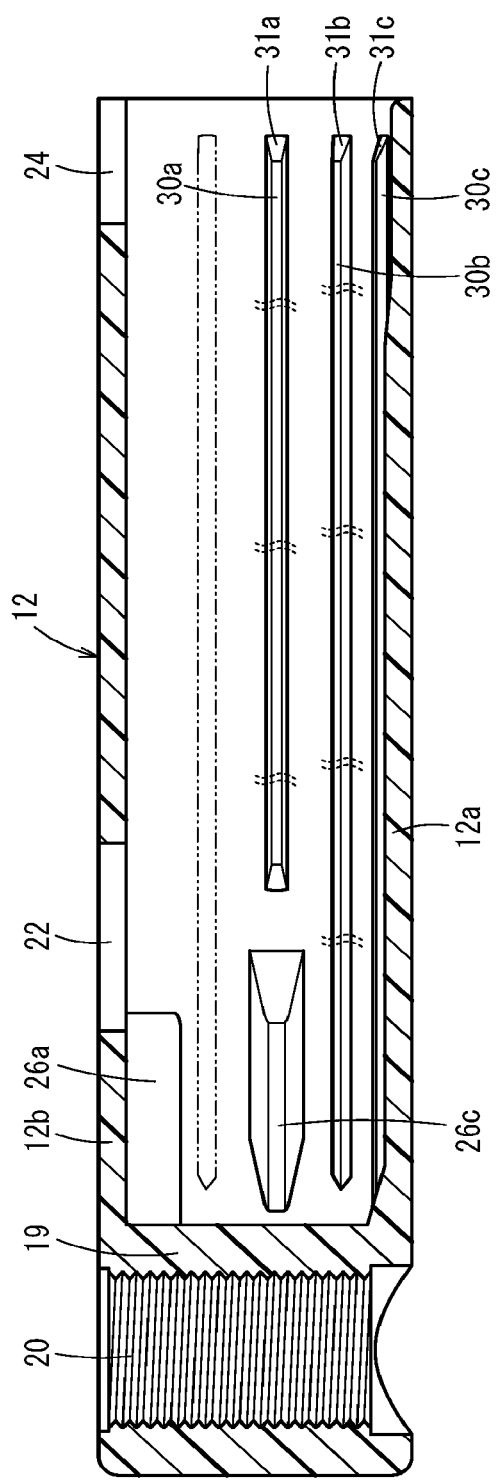
FIG. 4 is a cross-sectional view of the sensor case taken along line IV-IV in FIG. 3.
Figure 5:
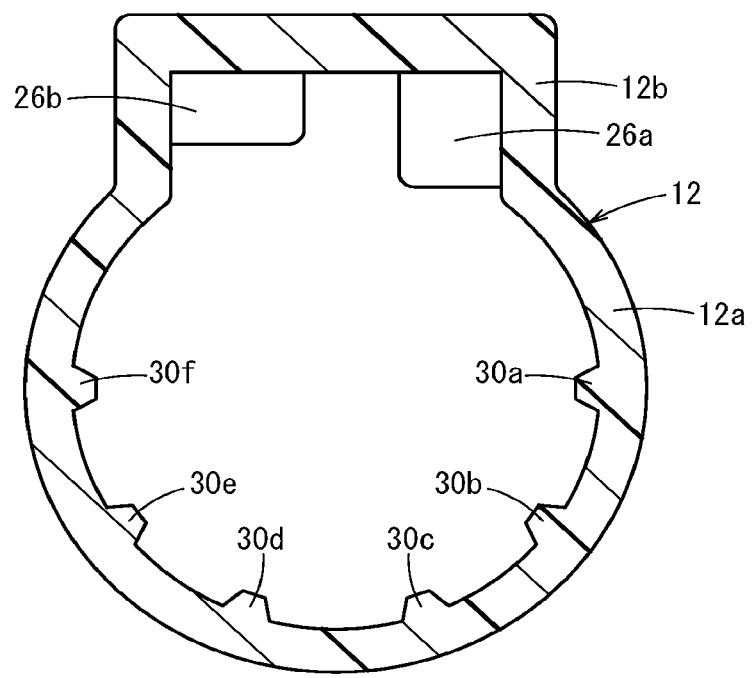
FIG. 5 is a cross-sectional view of the sensor case taken along line V-V in FIG. 3.
Figure 6:
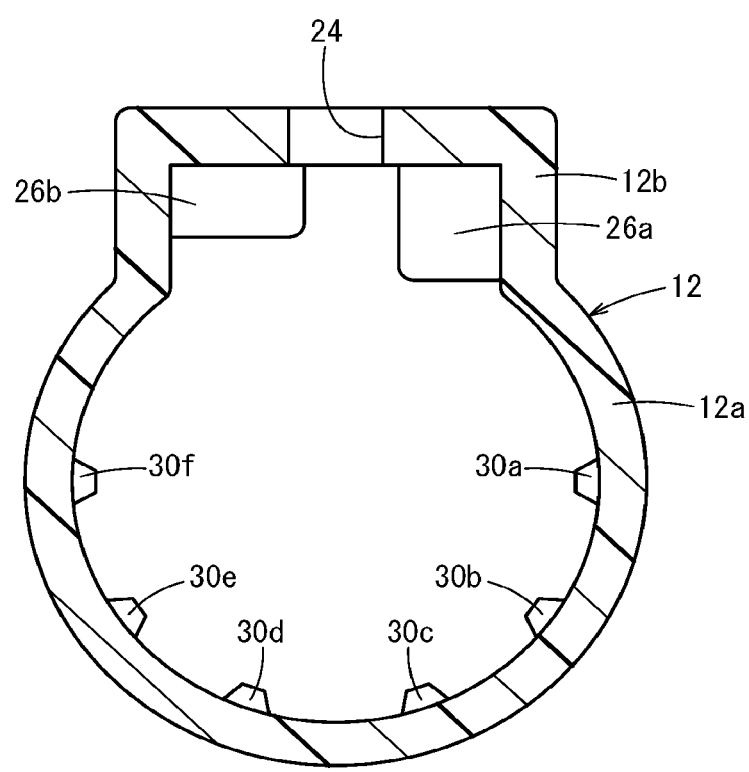
FIG. 6 is a sectional end view of the sensor case, viewed from VI-VI direction in FIG. 3.
Figure 7:
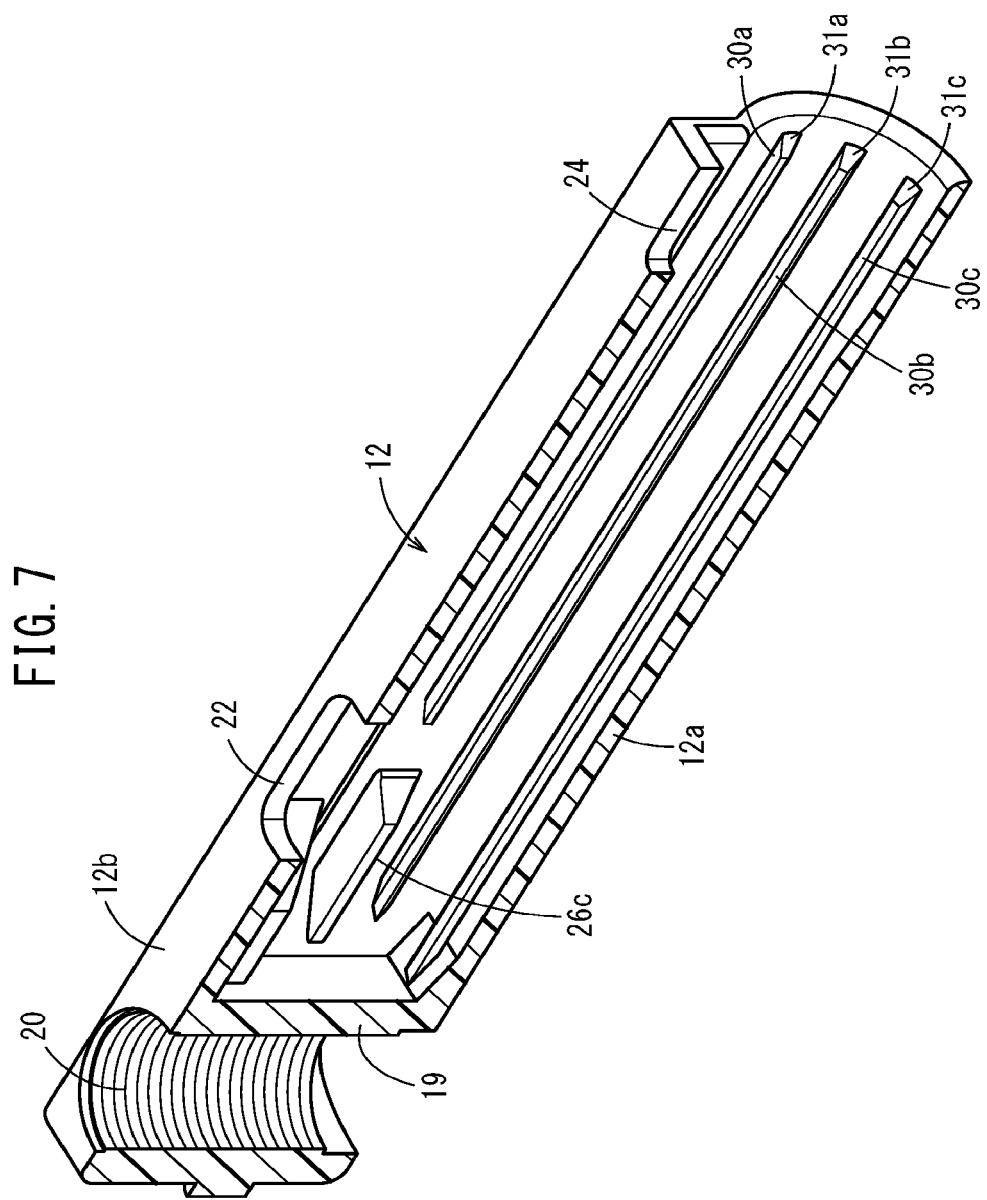
FIG. 7 is a perspective view of the sensor case illustrated in FIG. 4.

In this case, in a modification including a support portion 26*c* protruding from the inner wall of the cylindrical portion 12*a* in addition to the support portions 26*a* and 26*b*, the rib 30*a* may be terminated at a predetermined position without reaching the partition 19 of the case 12 (see FIG. 4). Furthermore, as indicated by long dashed double-short dashed lines in FIG. 4, another rib may be formed on the cylindrical portion 12*a* adjacent to the rectangular parallelepiped portion 12*b*. In addition, as indicated by dotted lines in FIG. 4, the ribs 30*a* to 30*f* may extend discontinuously in the axial direction of the case 12. This further improves fillability of a molten resin during injection. In this case, the end portions 31*a* to 31*f* of the ribs 30*a* to 30*f*, respectively, cut out to be tapered adjacent to the second end part allow the molten resin injected from the long groove 24 to flow from the top to the bottom in FIG. 4 with excellent fillability. The ribs 30*a* to 30*f* here are simply described as protrusions. However, the cross-sectional shape of the ribs 30*a* to 30*f* is preferably but not limited to trapezoidal as illustrated in FIG. 5, and may be arch-shaped or quadrangular.

Figure 8:
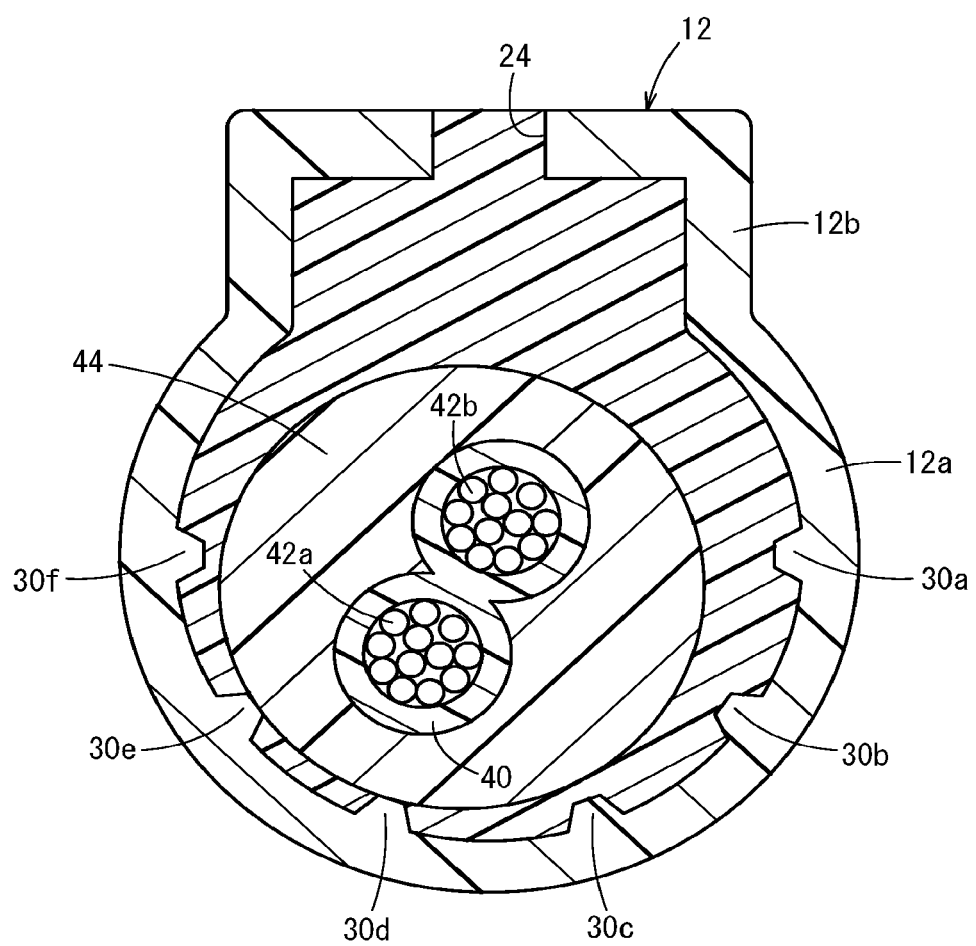
FIG. 8 is a cross-sectional view illustrating a state where ribs protruding from the inner wall of the case prevent cables from coming into contact with the inner wall of the case after a molten resin is injected into the sensor case.

As illustrated in FIG. 8, the cable 14 includes a plurality of conductors 42*a* and 42*b* covered with an insulating film 40 and a sheath 44 covering the conductors 42*a* and 42*b* together with the insulating film 40.

Next, a method for manufacturing the position detection switch 10 according to this embodiment will be described.

First, the substrate 18 fixed to the ends of the lead wires 16 constituting the cable 14 is inserted along the ribs 30*a* to 30*f*. At this moment, the substrate 18 is inserted such that the light emitting part of the LED 21 mounted on the substrate 18 opposes the window 22. In this manner, the substrate 18 is held by the support portions 26*a* and 26*b* disposed at the end of the cylindrical portion 12*a* while the LED 21 faces the window 22. The support portions 26*a* and 26*b* do not necessarily hold the substrate 18 firmly and only need to prevent displacement of the substrate 18 in directions orthogonal to the axial direction of the case 12 beyond a predetermined range. Thus, while the sheath 44 constituting the cable 14 is partially fitted in the case 12 adjacent to the second end part, the cable 14 and the sheath 44 are accommodated in a mold (not illustrated). At this time, the opening of the case 12 adjacent to the first end part is closed with the mold. Next, the molten resin is injected from the long groove 24 at a predetermined pressure. More specifically, in this case, the molten resin is injected in a direction orthogonal to the axis of the case 12.

Figure 10:
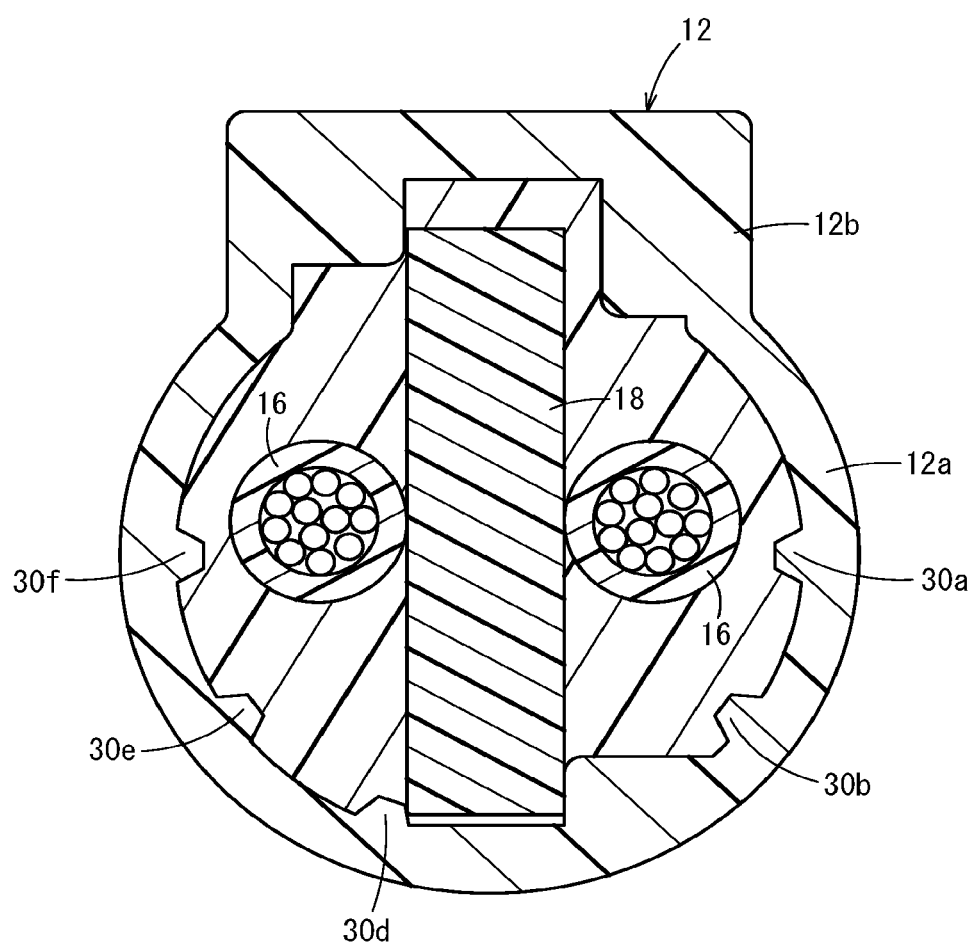
FIG. 10 is a cross-sectional view of a modification of an embodiment illustrated in FIG. 9, and illustrates a state where the molten resin has cured while the lead wires are connected to surfaces on either side of the substrate.
Figure 11:
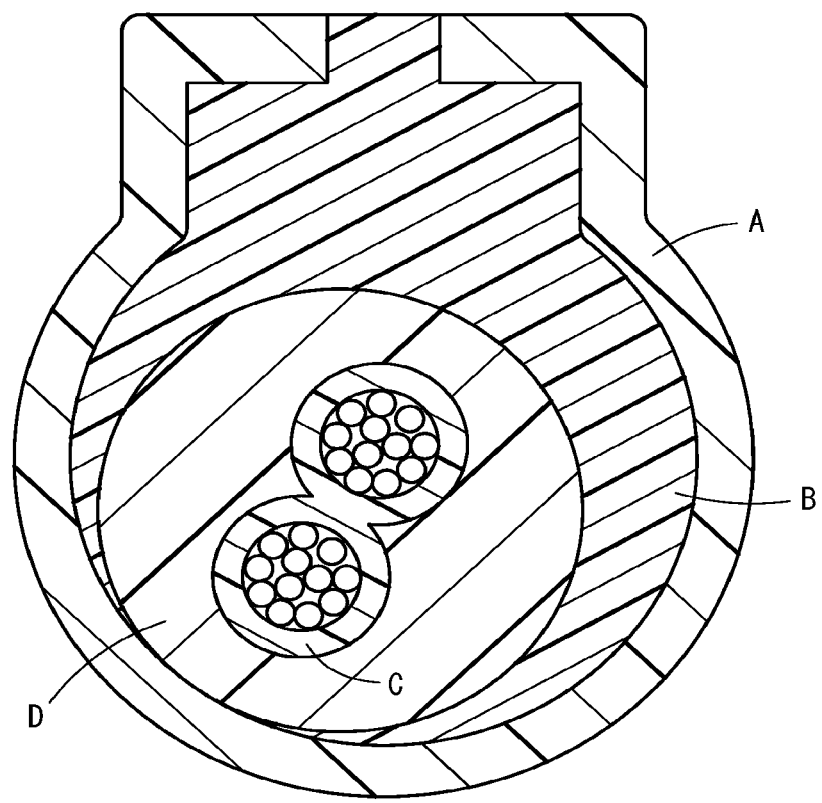
FIG. 11 is a cross-sectional view illustrating a joint state between a sensor case and a sheath according to a known technology.

If the ribs 30*a* to 30*f* protruding from the inner wall of the cylindrical portion 12*a* do not exist, the resin injected from the long groove 24 presses the surface of the sheath 44 against the inner wall of the cylindrical portion 12*a* by the pressing force (see FIG. 10). More specifically, in this case, the surface of the sheath 44 and the inner wall of the cylindrical portion 12*a* are brought into direct contact with each other. Thus, the molten resin cures without flowing into the contact portion. In the position detection switch completed in such a state, the sheath 44 may be easily separate from the inner wall of the case 12 or cracked by applying an external force, for example, by pulling the cable 14. As a result, fine particles or moisture, for example, may enter through the separate or cracked portion and may cause electrical defects.

Figure 9:
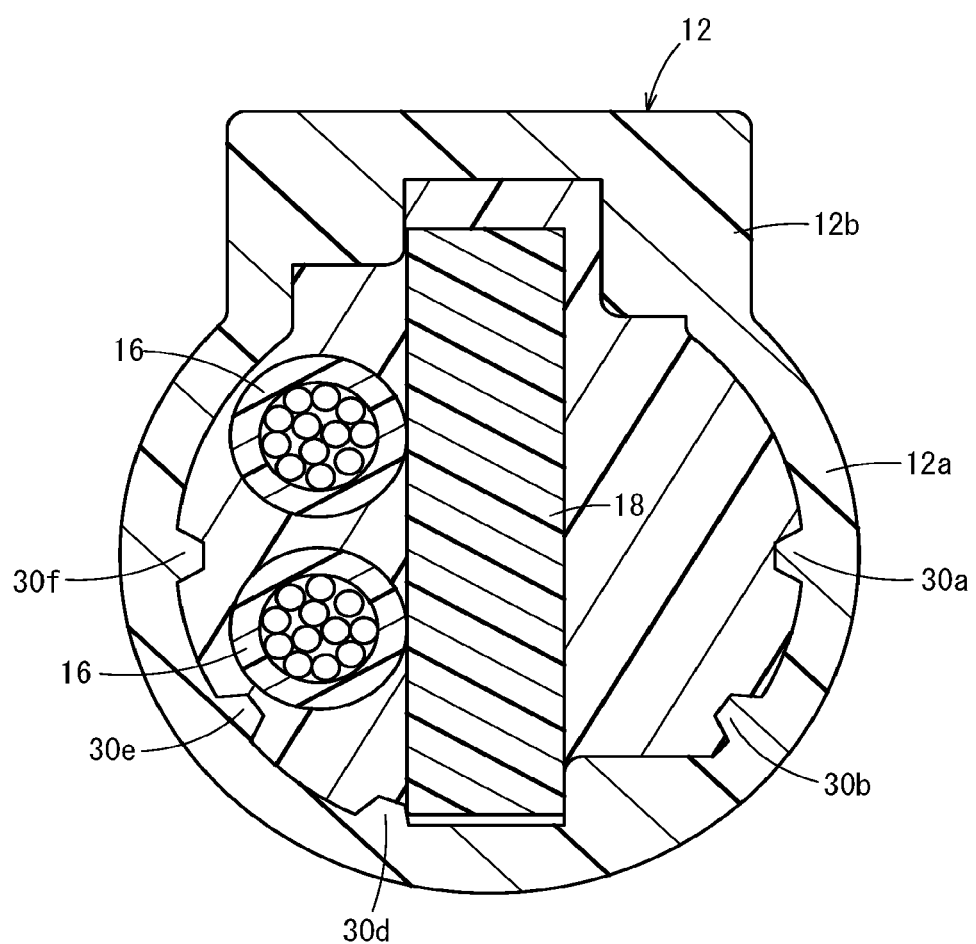
FIG. 9 is a cross-sectional view illustrating a state where the molten resin after it has cured holds a substrate and lead wires connected to the substrate while the substrate and the lead wires are separate from the inner wall of the case.

However, in a case where the ribs 30*a* to 30*f* protrude between the sheath 44 and the cylindrical portion 12*a* as illustrated in FIGS. 8 and 9, the outer circumferential wall of the sheath 44 does not come into direct contact with the inner circumferential wall of the cylindrical portion 12*a*, and the resin can flow into the gaps between the outer circumferential wall of the sheath 44 and the inner circumferential wall of the cylindrical portion 12*a*. More specifically, the fillability of the resin improves, and the ribs 30*a* to 30*f* engage in the sheath 44 to increase the contact area between the components. As a result, the completed position detection switch 10 in this embodiment has excellent durability against external forces and high stiffness due to less breakable joint surfaces between the sheath and the case. Furthermore, the ribs 30*a* to 30*f* stabilize the flowing state of the molten resin and prevent bubbles and the like from being generated during the resin injection. This lead wires to an increase in adhesiveness between the sheath and the case.

The present invention has been described using a preferred embodiment as an example. However, the present invention is not limited to the above-described embodiment, and various modifications and changes in design can be made thereto without departing from the scope of the present invention as a matter of course. For example, as illustrated in FIG. 10, in a case where electric circuits are printed on both sides of the substrate 18, two lead wires 16 may be separately connected to surfaces on either side if there is no electrical problem. The molten resin fills on both sides in a balanced manner.

The invention claimed is:

1. A position detection switch, comprising:
   a sensor case;
   a circuit substrate with an electronic component mounted thereon to be disposed inside the sensor case; and
   a cable including a lead wire electrically connected to the circuit substrate, wherein:

the lead wire is enclosed with a sheath;

the sensor case includes a plurality of ribs separate from each other at a predetermined interval on an inner wall of the sensor case and extending in an axial direction of the sensor case; and the ribs separate the sheath from the inner wall of the sensor case to leave a gap between the sensor case and the sheath in injection of a molten resin into the sensor case.

2. The position detection switch according to claim 1, wherein the ribs extend from positions away from a point corresponding to a molten resin injection port located at one end part of the sensor case toward another end part.

3. The position detection switch according to claim 2, wherein end portions of the ribs located adjacent to the molten resin injection port in the axial direction of the sensor case are cut out.

4. The position detection switch according to claim 1, wherein a cross-sectional shape of the ribs orthogonal to the sensor case is trapezoidal, arch-shaped, or quadrangular.

5. The position detection switch according to claim 1, wherein the sensor case and the ribs are integrally molded using a material of an identical property.

6. The position detection switch according to claim 1, wherein the ribs extend discontinuously in the axial direction of the sensor case.

7. The position detection switch according to claim 1, wherein a support portion is disposed on the inner wall to hold the circuit substrate, and the end portions of the ribs are separate from the support portion.

8. The position detection switch according to claim 7, wherein the end portions of the ribs are cut out to be tapered.

9. The position detection switch according to claim 1, wherein a plurality of the lead wires are electrically connected to surfaces on either side of the circuit substrate.

\* \* \* \* \*